2 Sheets--Sheet 1.

NELSON BURR.

Improvement in Grinding Mills.

No. 4,742. Reissued Feb. 6, 1872.

Witnesses.

J. S. Dennis
R. D. Smith

Inventor.

Nelson Burr
by Lewis L. Coburn
Atty

2 Sheets--Sheet 2.

NELSON BURR.

Improvement in Grinding Mills.

No. 4,742. Reissued Feb. 6, 1872.

Witnesses.

J. S. Dennis
R. D. Smith

Inventor.

Nelson Burr
by Lewis L. Coburn
Atty

UNITED STATES PATENT OFFICE

NELSON BURR, OF BATAVIA, ILLINOIS.

IMPROVEMENT IN GRINDING-MILLS.

Specification forming part of Letters Patent No. 29,462, dated August 7, 1860; reissue No. 4,742, dated February 6, 1872.

DIVISION B.

SPECIFICATION (B.)

*To all whom it may concern:*

Be it known that I, NELSON BURR, of Batavia, in the county of Kane and State of Illinois, have invented certain new and useful Improvements in Portable Mills; and I do hereby declare that the following is a full, clear, and exact description of the same, reference being had to the accompanying drawing and to the letters of reference marked thereon, in which—

Figure 2:
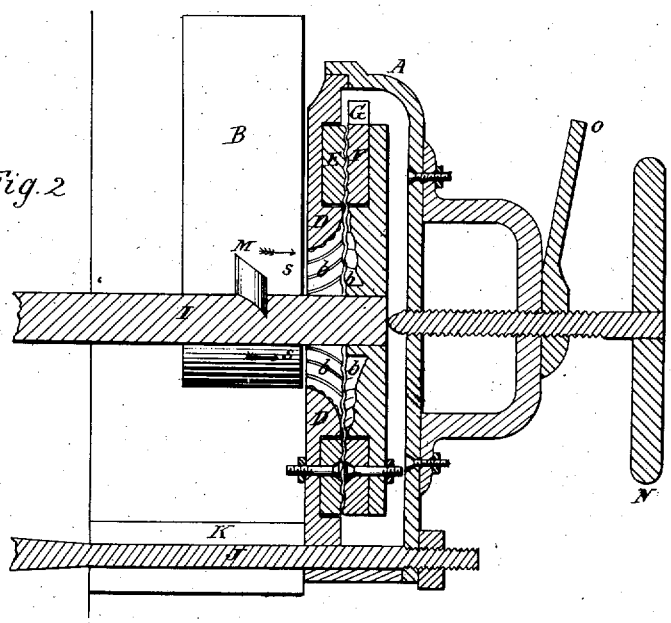
Figure 1:
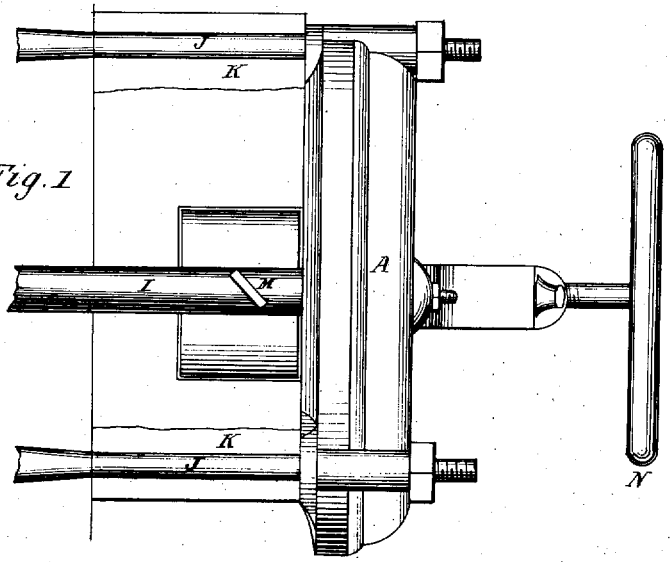
Figure 3:
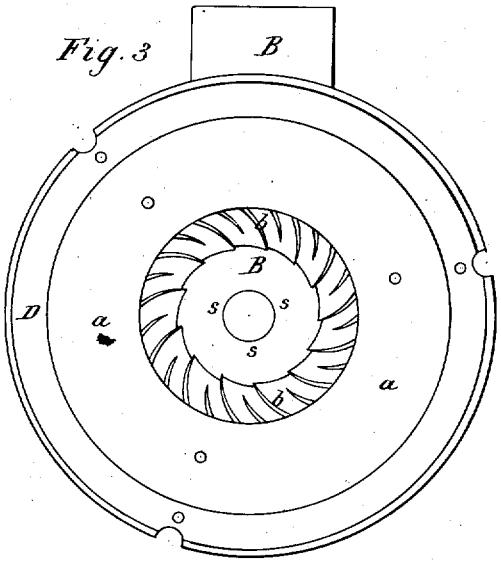
Figure 4:
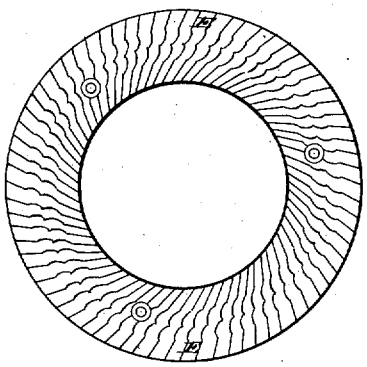
Figure 5:
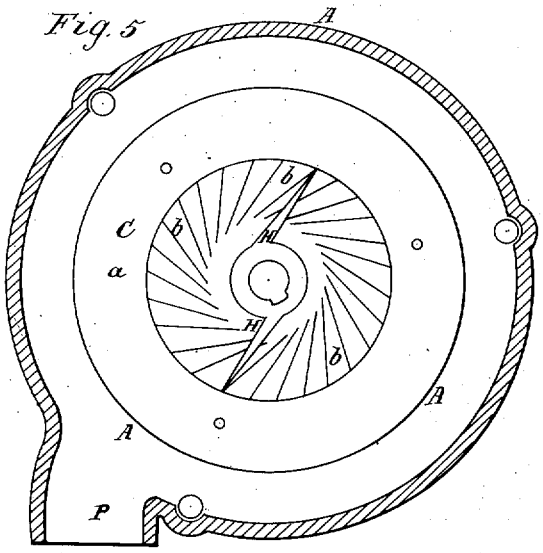
Figure 6:
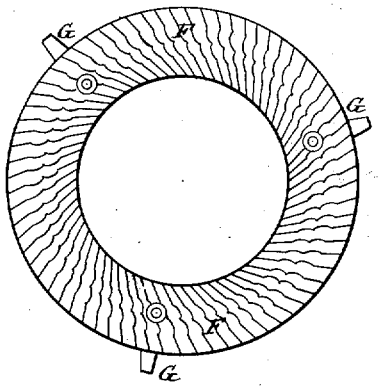

Figure 1 is a side elevation. Fig. 2 is a sectional view. Fig. 3 is an inside view of the stationary plate. Fig. 5 an inside view of the revolving plate lying in the shell. Figs. 4 and 6 represent the rings or grinding-surfaces.

The nature of my invention consists in constructing the revolving and stationary plates with circular chambers, in order to admit the grinding-rings or surfaces. Also, in the employment and arrangement of other devices, which will be hereinafter fully described.

To enable others skilled in the art to make and use my invention, I will now describe its construction and operation.

A represents the shell or outside covering to the two plates. B is the grain-receiver or hopper. D is the stationary plate, and C the revolving plate. I is a shaft which passes through the lower portion or receiver B, also through the stationary plate D, and is secured to the revolving plate C. M is a spiral wing on the shaft I inside the receiver B, for the purpose of agitating and conveying the grain through the opening S in the stationary plate, and from thence to the grinding-surfaces by the drift *b*. *a* are circular chambers in both the stationary and revolving plates. E F are rings or grinding-surfaces, which may be taken out and replaced in the chambers *a* as often as they become dull or worn out, at a very small expense. H H represent wings in the drift on the revolving plate C for the purpose of gathering the grain before it enters the grinding-surfaces. N is the regulating-gauge, provided with the thumb-screw *o* for the purpose of holding the gauge to its proper place.

The operation of my machine is as follows: The grain is placed in the receiver B and is agitated, according to the velocity of the shaft I, by the wing M, being conveyed through the opening S; thence to the grinding-surfaces E F; it is ground either coarse or fine as you have regulated the plates, and then discharged at the spout P.

It will be seen that, in constructing a mill as set forth above, I entirely overcome the objection so much urged against iron mills, to wit: the great expense necessary to keep them in repair. My rings or grinding-surfaces may be replaced, whenever worn out, for a very small sum, thus rendering the mill in all respects as good as when first purchased, and as it is designed to grind either flour, meal, or feed for horses it will be found to possess a great advantage for family use.

It will be observed that the drifts *b b*, constructed on the concave surfaces of the backing plates C and D, assist in carrying the grain to the grinding-rings E and F. If these surfaces were left smooth the grain as it passes into the space between the backing plates would fall to the lower part thereof, and would have nothing to carry it to the entire circumference of the rings, except the centrifugal force caused by the revolution of the plate C. These drifts agitate the grain and assist in carrying it up and out to the entire circumference of the grinding-rings.

Having thus fully described my invention, what I claim, and desire to secure by Letters Patent, is—

1. The combination of the drifts *b b*, made on the concave surfaces of the backing-plates C and D, and the detachable metallic grinding-rings E and F, when so constructed that the drifts serve only to assist in carrying the grain to the rings, substantially as specified and shown.

2. I claim the combination of plates C and D, spiral wings H H, adjustable grinding-surfaces E F, and receiver B, the whole being constructed substantially as and for the purpose specified.

NELSON BURR.

Witnesses:

GEO. G. LYON,

WM. D. NICHOLS.